(12) United States Patent
Gostev et al.

(10) Patent No.: US 8,484,347 B1
(45) Date of Patent: Jul. 9, 2013

(54) SYSTEM AND METHOD FOR MALWARE DETECTION IN PEER-TO-PEER COMPUTER NETWORKS

(75) Inventors: Alexander A. Gostev, Moscow (RU); Andrey V. Nikishin, Moscow (RU); Igor I. Soumenkov, Moscow (RU); Roman V. Rybalko, Moscow (RU)

(73) Assignee: Kaspersky Lab Zao, Moscow (RU)

( * ) Notice: Subject to any disclaimer, the term of this patent is extended or adjusted under 35 U.S.C. 154(b) by 0 days.

(21) Appl. No.: 13/527,561

(22) Filed: Jun. 19, 2012

(51) Int. Cl.
*G06F 15/173* (2006.01)

(52) U.S. Cl.
USPC ............... 709/225; 707/9; 713/187; 719/318; 726/22

(58) Field of Classification Search
USPC .............. 709/225; 713/187; 726/22; 719/318
See application file for complete search history.

(56) References Cited

U.S. PATENT DOCUMENTS

| | | | |
|---|---|---|---|
| 6,993,660 B1 | 1/2006 | Libenzi et al. | |
| 7,328,349 B2 | 2/2008 | Milliken | |
| 7,426,574 B2 | 9/2008 | Liao | |
| 7,496,956 B1 | 2/2009 | Viljoen et al. | |
| 7,877,801 B2 * | 1/2011 | Repasi et al. | 726/22 |
| 2003/0131280 A1 * | 7/2003 | Gittins et al. | 714/8 |
| 2005/0021994 A1 | 1/2005 | Barton et al. | |
| 2006/0200736 A1 * | 9/2006 | Smit et al. | 715/500 |
| 2007/0162975 A1 | 7/2007 | Overton et al. | |
| 2007/0244894 A1 * | 10/2007 | St. Jacques | 707/9 |
| 2008/0147612 A1 | 6/2008 | Gryaznov | |
| 2009/0119681 A1 * | 5/2009 | Bhogal et al. | 719/318 |

FOREIGN PATENT DOCUMENTS

| | | |
|---|---|---|
| EP | 2020798 A3 | 4/2009 |
| JP | 2006178748 | 7/2006 |

\* cited by examiner

*Primary Examiner* — Kyung H Shin
(74) *Attorney, Agent, or Firm* — Arent Fox LLP; Michael Fainberg (57) ABSTRACT

Disclosed are systems, methods and computer program products for malware detection in a peer-to-peer (P2P) network. In one example embodiment, a peer node of the P2P network receives a user request to download a data object from the P2P network. The peer node obtains a metadata object associated with the requested data object and extracts from the metadata object a checksum associated with the requested data object. The peer node then determines if the extracted checksum is associated with a malicious data object by comparing the extracted checksum with checksums of known malicious data objects stored in a local malware database. If the checksum of the requested data object matches a checksum of a malicious data object, the user request to download the data object form the P2P network is denied.

12 Claims, 4 Drawing Sheets

SYSTEM AND METHOD FOR MALWARE DETECTION IN PEER-TO-PEER COMPUTER NETWORKS

TECHNICAL FIELD

The present disclosure relates generally to the field of malware detection and, in particular, to systems, methods and computer program products for malware detection in peer-to-peer (P2P) computer networks.

BACKGROUND

Driven by the growing popularity of digital media, such as e-books, digital music, movies, videogames, software applications and other digital content, use of file sharing peer-to-peer (P2P) networks increased significantly. P2P networks allow computers to communicate directly with one another rather than through a central server. BitComet® and μTorrent™ are examples of popular P2P networking applications. P2P networks usually use BitTorrent® protocol or other type of peering protocol for communication. These networking protocols allow peer computer nodes to send/receive requests for data objects, such as a file or groups of files, to/from other peer nodes within the P2P network. The requested data object is then downloaded in pieces from multiple source peer nodes and reassembled at a client peer node. The distributed architecture of the P2P networks provides enhanced scalability and service robustness.

However, the unregulated nature of P2P networks and the ever-growing number of the users makes these networks very vulnerable to the spread of malware, such as viruses, warms, Trojans, spyware and the like. The malware may be planted into file archives containing necessary network information or inserted into fraudulent copies of software applications, which are distributed between peer nodes. The current antivirus products usually operate by scanning objects distributed through the P2P networks only after these objects have been downloaded on user computer(s), thereby exposing user computer(s) to the downloaded malware and consuming network resources and time on the distribution of harmful objects. Accordingly, there is a need for a more effective technique for malware detection in P2P networks.

SUMMARY

Disclosed herein are systems, methods and computer program products for malware detection in P2P networks. In one example embodiment, a peer node of the P2P network receives a user request to download a data object from the P2P network. The peer node downloads a metadata object associated with the requested data object and extracts from the metadata file a checksum associated with the requested data object. The peer node then determines if the extracted checksum is associated with a malicious data object by comparing the checksum associated with the requested data object with a plurality of checksums associated with malicious data objects stored in a local malware database. If it is determined that the checksum of the requested data object is associated with a malicious data object, the user request to download the data object is denied. If it is determined that the checksum is not associated with a malicious data object, the user request is granted and object may be downloaded.

The peer node may then downloads pieces of the requested data object from a plurality of peer nodes and reassembles the data object from the downloaded pieces. The peer node then verifies authenticity of the data object by computing checksum of the data object and comparing the computed checksum with the checksum extracted from the metadata file associated with the requested data object. The peer node may then determining if the requested data object is malicious by performing antivirus analysis of the authenticated data object. Alternatively, the peer node may perform antivirus analysis of one or more downloaded pieces of the requested data object before all pieces are downloaded and the data object is reassembled.

If the peer node determines that the requested data object is malicious, it can update local malware database with a copy of the checksum of the requested data object. The peer node may also determine if a remote malware database, which is accessible to the plurality of peer nodes of the P2P network, contains a copy of the checksum of the malicious data object. If the remote malware database does not contain said checksum, the peer node may update the remote malware database with a copy of the checksum. In this manner, information about newly discovered malicious data objects becomes accessible to all peer nodes in the P2P network and the spread of malware through the network may be prevented.

The above simplified summary of example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DETAILED DESCRIPTION OF EXAMPLE EMBODIMENTS

Example embodiments are described herein in the context of systems, methods and computer program products for malware detection in peer-to-peer (P2P) computer networks. Those of ordinary skill in the art will realize that the following description is illustrative only and is not intended to be in any way limiting. Other embodiments will readily suggest themselves to those skilled in the art having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
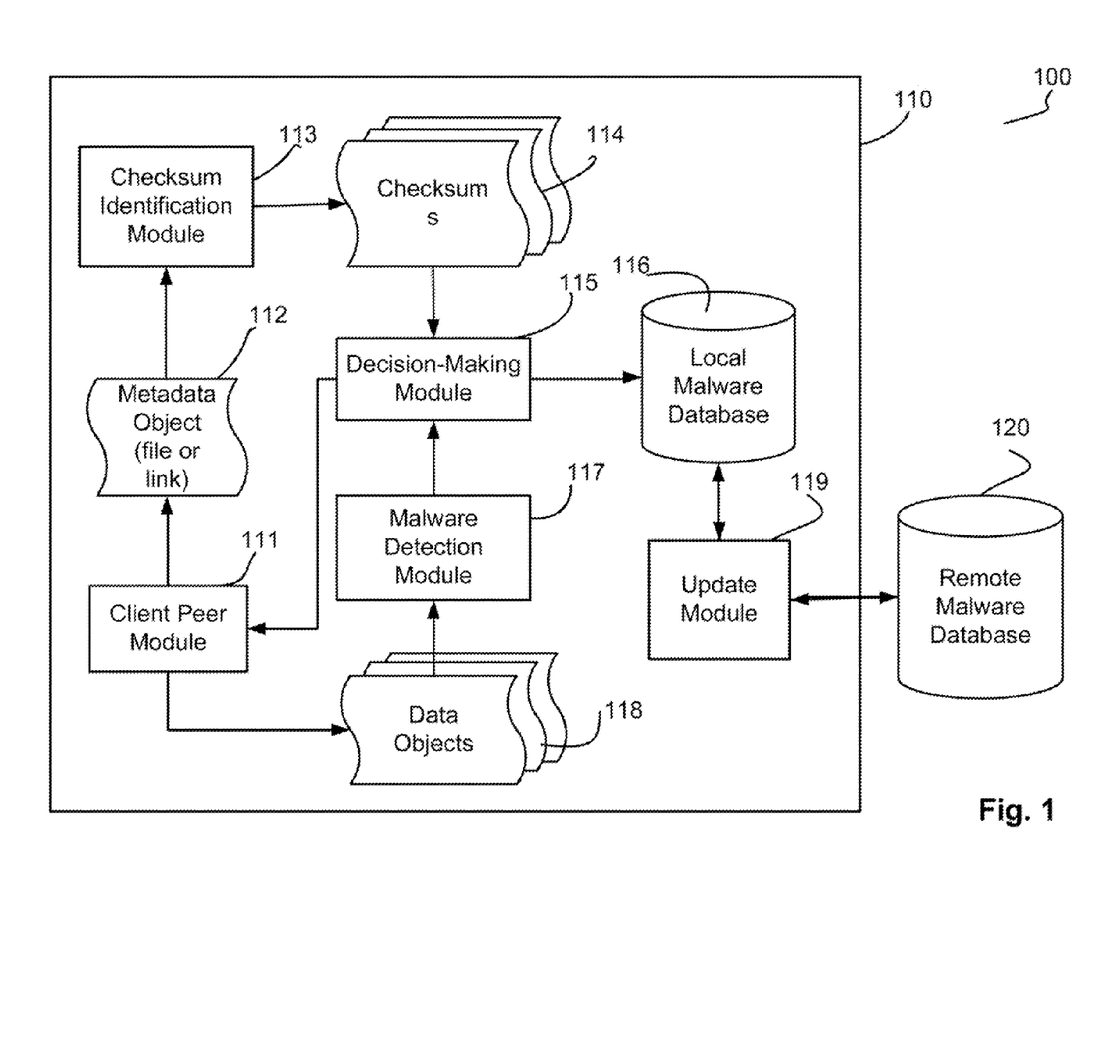
FIG. 1 illustrates a schematic block diagram of a system for malware detection in a P2P network in accordance with one example embodiment.

FIG. 1 illustrates a schematic block diagram of a system for malware detection in P2P computer network in accordance with one example embodiment. P2P network 100 includes one or more computers 110. A computer 110 may include, but are not limited to, a personal computer (PC), a server computer, a network router, a notebook, a smart phone, or other type of programmable machine connected to a network, such as the Internet, or other type of personal, local, wide or metropolitan area network. Generally, computers 110 in P2P network are called peer nodes. An example configuration of the computer system 110 is described in greater detail herein below with reference to FIGS. 1 and 3.

In one example embodiment, computer 110 may execute BitComet®, μTorrent™ or another peering application. The peering application may utilize BitTorrent® or another peering protocol that enables computer(s) 110 to form or to connect to a P2P network for sharing of digital media, such as e-books, audio recordings, movies, videogames, applications and other digital content. The shared digital content will be commonly referred herein as objects and data objects. When connected to a P2P network, computer 110 may function as a client peer node, which requests object(s) from other peer nodes, or as source peer node, which provides one or more pieces of the requested object(s) to the client peer node, as known in the art.

In one example embodiment, computer 110 includes the following software modules that facilitate malware detection in P2P computer network in accordance with principles described herein. The modules include: a client peer module 111, a checksum identification module 113, a decision-making module 115, a local malware database 116, a malware detection module 117, an update module 119 and a remote malware database 120. In general, these modules may include programs, scripts, codes, plug-ins and data structures containing computer-executable instructions that implement malware detection algorithms in P2P networks.

In one example embodiment, client peer module 111 is a software module configured to connect to a P2P network and download data objects requested by the system user. More specifically, to obtain a data object, client peer module 111 may first connect to a tracker computer (not shown) that coordinates object distribution on the P2P network 100. In one example embodiment, the tracker computer identifies peer nodes that can provide the requested object to the client peer module 111. In another example embodiment, the tracker computer also provides to the client peer module 111 a metadata object 112, which in one example may include a file containing metadata associated with the required data object, such metadata file is also known as a "torrent" file. The metadata file contains information about the data object, including its checksum, which is a unique object identifier, and other metadata parameters associated with the data object, such as the name of the data object and its boot size, the keywords for searching for the data object and other parameters. Once the metadata file is downloaded, client peer module 111 passes it to a checksum identification module 113.

In alternative embodiment, the metadata object 112 may include a link that identifies the location of the requested data object. The client peer module 111 may download the requested data object from the location identified in the metadata link. In one example, the metadata link may include a checksum of the data object and other parameters identifying the corresponding data object. The metadata link can be, for example, represented as follows: magnet:?xl=10826029&xt=urn:tree:tiger :7N50AMRNGMSSEUE3ORHOKWN4WWIQ5X4E BOOTL JY. This metadata link includes a checksum of the corresponding data object. The client peer module 111 may pass this metadata link to a checksum identification module 113. 100161 In one example embodiment, checksum identification module 113 is a software module configured to identify and extract from the metadata object 112 one or more checksums 114 associated with the requested data object(s) 118. Checksum is a unique object identifier, which allows client peer module 111 to verify the integrity of the data object 118 once it is received and reassembled from its pieces by module 111. If client peer module 111 requested several objects 118 described by a single metadata file, then this file will contain checksums for all requested data objects. In one example embodiment, checksum 114 may include a secure hash of the data object, such as a hash generated using a cryptographic hash function MD5, MD4, SHA1, SHA256, CRC32 or other. The extracted checksums 114 are then passes by the checksum identification module 113 to a decision-making module 115 for verification.

In one example embodiment, decision-making module 115 is a software module configured to search for matches between checksum(s) 114 extracted from the metadata object 112 and checksums stored in a local malware database 116 of the computer 110. In one example embodiment, database 116 contains checksum of known malicious data objects that contain malicious codes, which were, for example, downloaded through the P2P network. If the decision-making module 115 finds in the local malware database 116 a checksum that matches checksum 114 associated with the requested data object 118, module 115 may decide that object 118 contains a virus or other type of malware and may prohibit the client peer module 111 to download the user-requested object 118 from the P2P network. Therefore, computer 110 has been protected from the exposure to a harmful data object and network resources were not consumed because the data object was not downloaded over the P2P network. If the decision-making module 115 does not find a matching checksum in the local malware database 116, the client peer module 111 is allowed to download the requested data object on the computer 110.

If download has been permitted by the decision-making module 115, the client peer module 111 connects to the one or more source peer nodes identified by the tracker computer and begins to download pieces of the requested data object on computer 110. Once all pieces have been downloaded, client peer module 111 assembles them into the data object 118. Once data object 118 have been assembled, the client peer module may use object's checksum 114 to verity integrity of the data object, i.e., that all pieces of the data object have been correctly downloaded and reassembled together to reconstruct the requested object. If data object turns out to be corrupted, client peer module 111 may request retransmission of the corrupted pieces and reassemble the object again. When integrity of the assembled data object 118 has been verified, the object may be passed for analysis to the malware detection module 117.

In one example embodiment, malware detection module 117 is a software module configured to analyze downloaded data object(s) 118 for presence of malware using one or more malware detection techniques, such as signature matching, heuristic analysis or other known technique. In one example embodiment, the malware detection module 117 may include one or more components of the Kaspersky® Antivirus software or other antivirus program. If, as a result of the malware analysis, malware detection module 117 detects malware in the downloaded data object 118, information about this malicious data object, such as object's checksum 114, may be passed to the decision-making module 115. Module 115 is configured to update local malware database 116 with the information about the malicious data object.

In one example embodiment, the malware detection module 117 may begin scanning downloaded pieces of the requested data object even before all pieces have been downloaded by the client peer module 111, so that a malicious data object may be detected even before all of its pieces have been downloaded on computer 110. In case malware is detected in the one or more downloaded pieces of the data object, download of the remaining pieces may be terminated and the checksum of the malicious data object may be added to the local malware database 116. In addition, the client peer module 111 may identify through the tracker computer other peer nodes that requested the same data object and notify those nodes either directly or through the tracker computer that the requested data object was found malicious. Therefore, distribution of the malicious data object through the P2P network will be prevented.

In one example embodiment, system 100 may also maintain a remote malware database 120, which is accessible to all computers 110 in the P2P network. In one example embodiment, computer 110 may periodically upload information about newly discovered malicious objects to the remote malware database 120. Computer 110 may also periodically download from the remote malware database 120 information about newly discovered malicious objects and update their local malware databases 116 with this information. In this manner, information about new malicious objects is distributed to all computers in the P2P network. To enable access to the remote malware database 120, computer 110 may include an update module 119. Module 119 is a software module configured to compare lists of checksums stored in the local malware database 116 with those stored in the remote malware database 120 and to update database 116 or database 120 with checksums of newly discovered malicious objects.

Figure 2A:
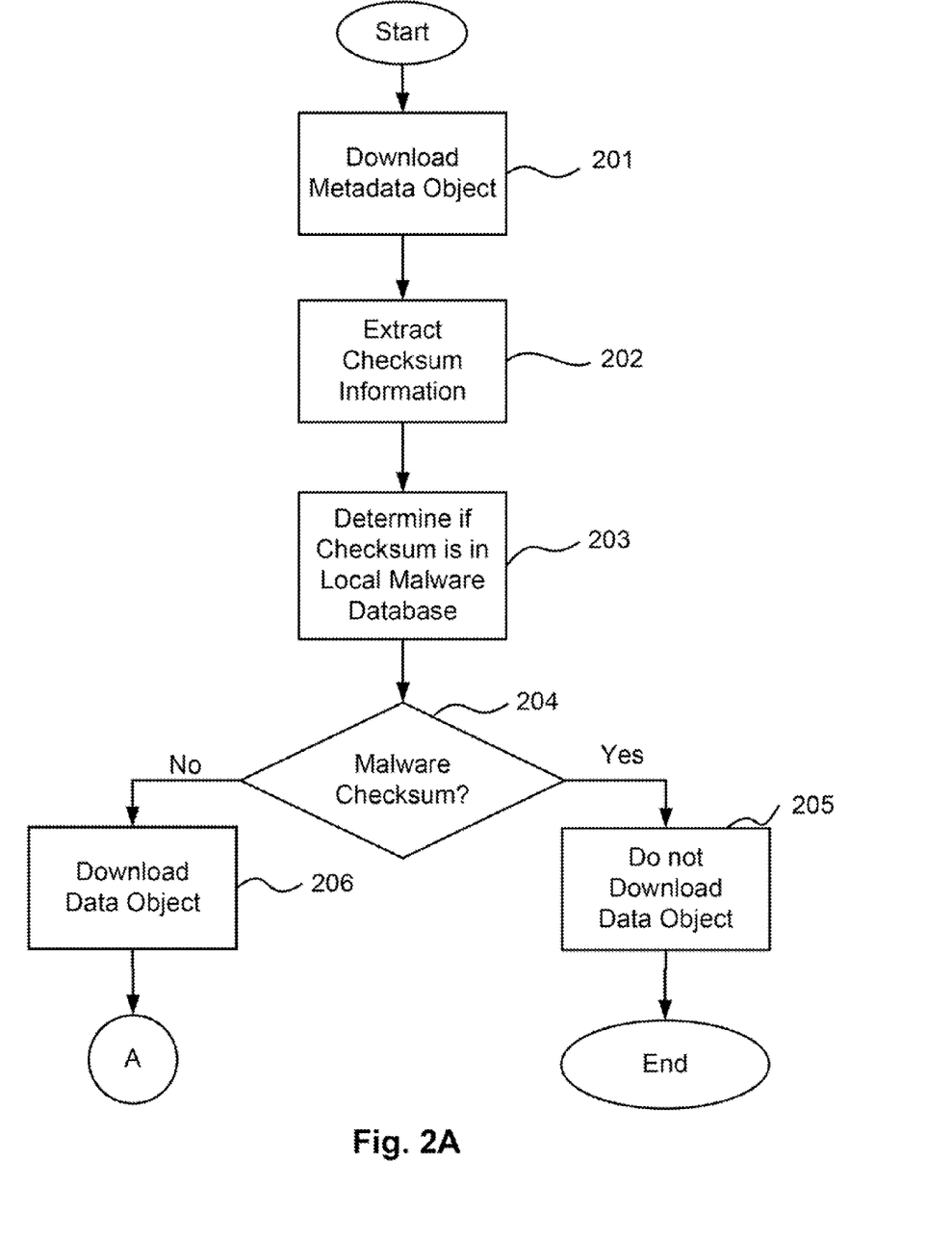
FIG. 2A and 2B illustrates a methodology for malware detection in a P2P network in accordance with one example embodiment.
Figure 2B:
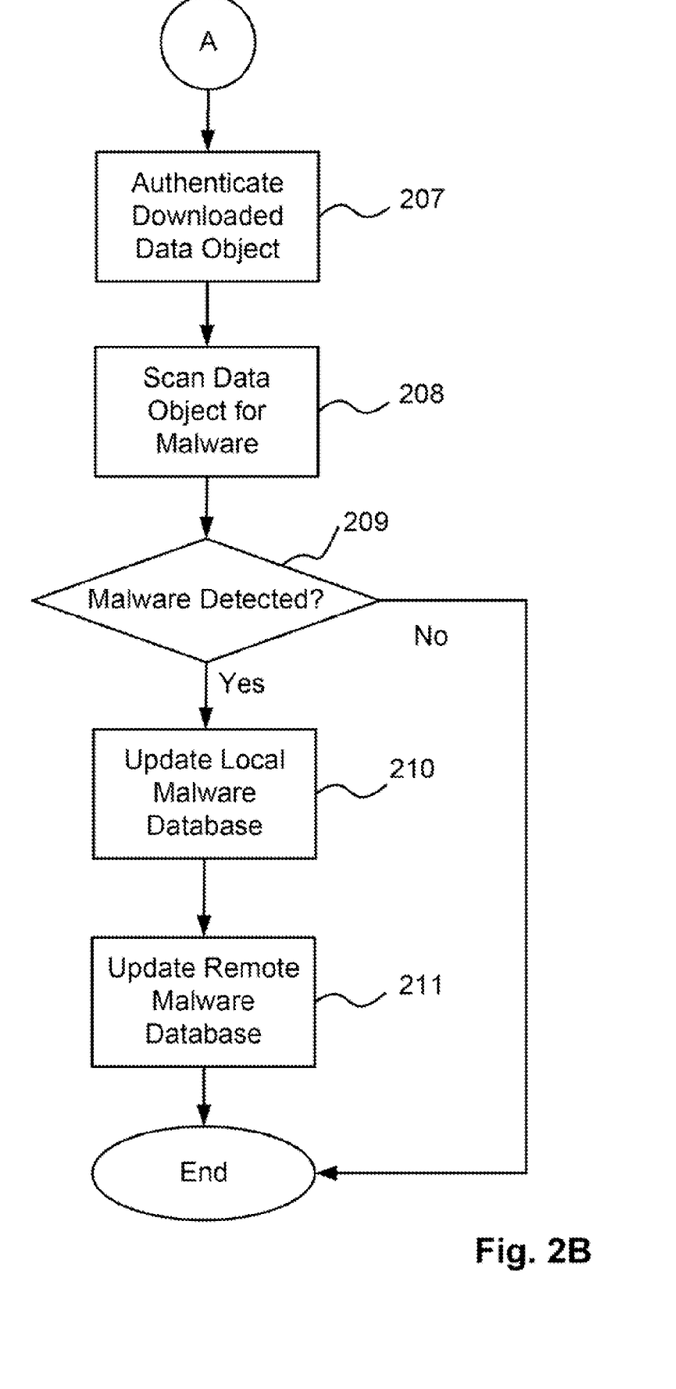

FIGS. 2A and 2B illustrate a methodology of malware detection in a P2P computer network in accordance with one example embodiment. At step 201, in a response to a user request for a data object, client peer module 111 of computer 110 identifies and connects to a tracker computer in the P2P network in order to obtain a metadata file for the requested object. At step 202, checksum identification module 113 identifies and extracts checksum information associated with requested data object from the obtained metadata file. At step 203, decision-making module 115 compares the checksum of the requested data object with the malware checksums stored in the local malware database 116. If, at step 204, checksum of the requested data object matches one of the malware checksums, at step 205, decision-making module 115 denies user request to download the requested data object on the computer 110. If, at step 204, checksum of the requested data object does not match any of the malware checksums, at step 206, decision-making module 115 grants user request and client peer module 111 downloads the requested data object form multiple source peer nodes identified by the tracker computer.

Once the requested data object is downloaded and reassembled from its pieces on computer 110, at step 207, client peer module 111 verifies authenticity of the downloaded object. In particular, module 111 may compute a checksum of the downloaded object and compare it with the checksum extracted from the metadata file. If the two checksums are identical, the downloaded data object is considered to be authentic. If the two checksums are not identical, module 111 may try to download again the data object from other source peer nodes. Once authenticity of the downloaded data object has been verified, at step 208, malware detection module 117 may analyze the data object for presence of malware. If, at step 209, malware is not detected in the data object, malware detection process may terminate and the data object may be provided to the user. If, however, at step 209, malware is detected, malware detection module 117 instructs decision making module to update, at step 210, the local malware database 116 with a copy of checksum of the newly discovered malicious data object. Once local malware database 116 has been update, update module 119 may compare it with the remote malware database 120 and update it with the copy of checksum of the newly discovered malicious object, at step 211, so that information about this object is accessible to other computers in the P2P network 100.

Figure 3:
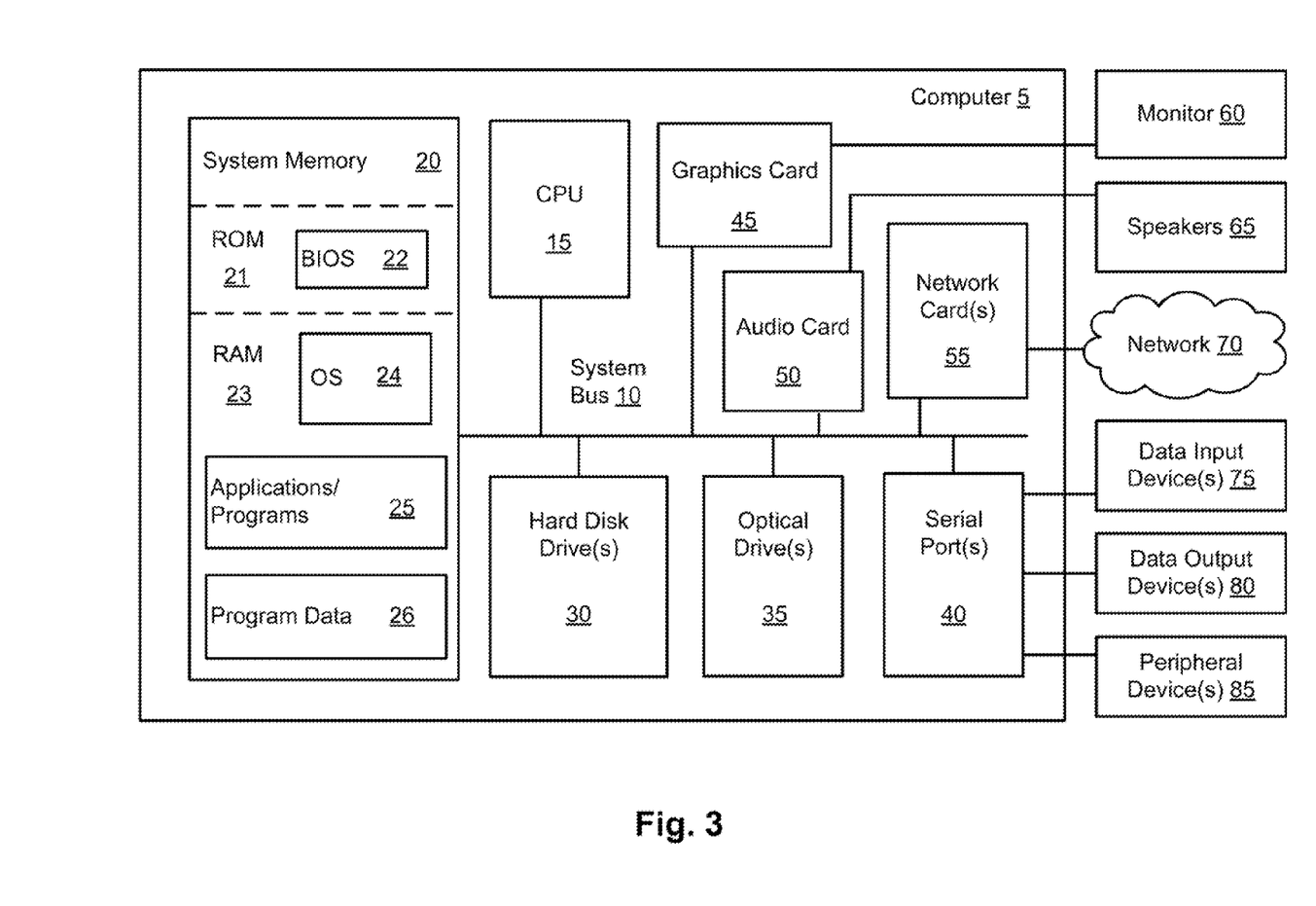
FIG. 3 illustrates a schematic block diagram of a computer system in accordance with one example embodiment.

FIG. 3 depicts an exemplary computer system 5, which can be used to implement computer 110 in accordance with one example embodiment. It should be noted that computer system 5 may also be used to implement a desktop computer, a workstation, a laptop computer, an application server or other type of data processing device. As depicted, computer system 5 includes CPU 15, system memory 20, hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include Intel® Core 2 Quad 2.33 GHz processor or other type of microprocessor.

System memory 20 includes a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® Vista® or other type of OS, that is responsible for management and coordination of processes and allocation and sharing of hardware resources in computer system 5. System memory 20 also stores applications and programs 25 that are currently running on the computer 5, including an antivirus application and various other programs. System memory 20 also stores various runtime data 26 used by the applications and programs 25.

Computer system 5 may further include hard disk drive(s) 30, such as 500GB SATA magnetic hard drive, and optical disk drive(s) 35 for reading from or writing to a removable optical disk, such as a CD-ROM, DVD-ROM or other optical media. Drives 30 and 25 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer 5, such as magnetic cassettes, flash memory cards, digital video disks, RAMs, ROMs, EPROMs and other types of memory may also be used in alternative embodiments of the computer system.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. Computer system 5 may also include graphics card 45, such as nVidia® GeForce® GT 240M or other video card, for interfacing with a monitor 60 or other video reproduction device. Computer system 5 may also include an audio card 50 for reproducing sound via internal or external speakers 65. In addition, computer system 5 may include network card(s) 55, such as Ethernet, Wi-Fi, GSM, Bluetooth or other wired, wireless, or cellular network interface for connecting computer system 5 to network 70, such as the Internet.

As used in this application, the terms "system," "component," "module" and the like are intended to include a computer-related entity, such as but not limited to hardware, firmware, a combination of hardware and software, software, or software in execution. For example, a module may be, but is not limited to being, a process running on a processor, a processor, an object, an executable, a thread of execution, a program, and/or a computer. By way of illustration, both an application running on a computing device and the computing device can be a software module. One or more modules can reside within a process and/or thread of execution and a module may be localized on one computer and/or distributed between two or more computers. In addition, these modules can execute from various non-transitory computer-readable medium having various data structures stored thereon. The modules may communicate by way of local and/or remote processes, such as in accordance with a signal having one or more data packets, such as data from one module interacting with another module in a local system and/or across a network, such as the Internet, with other computer systems.

In various embodiments, the methodologies for malware detection described herein may be implemented in hardware, software, firmware, or any combination thereof. If implemented in software, the functions may be stored or transmitted as one or more instructions or code on a non-transitory computer-readable medium. Computer-readable media includes both computer storage media and communication media including any medium that facilitates transfer of a computer program from one place to another. A storage medium may be any available media that can be accessed by a computer. By way of example, such computer-readable media includes, but not limited to, RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A method for malware detection in a peer-to-peer (P2P) network, the method comprises:
    receiving by a peer node a user request to download a data object from the P2P network;
    identifying a metadata object associated with the requested data object, wherein the metadata object includes at least a checksum of the data object;
    obtaining the identified metadata object associated with the requested data object;
    extracting from the metadata object the checksum of the data object;
    determining if the extracted checksum is associated with a malicious data object by comparing the checksum associated with the requested data object with a plurality of checksums associated with known malicious data objects stored in a local malware database;
    denying user request to download the data object from the P2P network if it is determined that the checksum is associated with a malicious data object and further notifying other peer nodes in the P2P network that the data object is malicious to prevent distribution of the malicious data object through the P2P network; or
    granting user request to download the data object from the P2P network if it is determined that the checksum is not associated with a malicious data object;
    downloading pieces of the requested data object from a plurality of peer nodes;
    analyzing each downloaded piece of the data object for presence of malware;
    when malware is detected in a piece of the data object, terminating downloading of remaining pieces of the data object; and
    when all of the pieces of the data object are downloaded, verifying authenticity of the downloaded data object by computing checksum of the downloaded data object and comparing the computed checksum with the extracted checksum, wherein
    if the computed checksum and the extracted checksum are identical, determining the downloaded data object is authentic, and if the computed checksum and extracted checksum are not identical, repeating the step of downloading the pieces of the requested data object from the plurality of peer nodes and analyzing each piece for the presence of malware.

2. The method of claim 1 further comprises:
determining by the peer node if the downloaded and authenticated data object is malicious by performing antivirus analysis of the data object.

3. The method of claim 2 further comprises:
updating local malware database with a copy of the checksum of the requested data object if it is determined that the requested data object is malicious.

4. The method of claim 3, further comprises:
determining if a remote malware database, which is accessible to the plurality of peer nodes, contains a copy of the checksum of the malicious data object; and
updating the remote malware database with a copy of the of the checksum if it is determined that the remote malware database does not contain said checksum.

5. A system for malware detection in a peer-to-peer (P2P) network, the system comprises:
a memory storing a local malware database of checksums of malicious data objects; and
a processor coupled to the memory, the processor being configured to:
receive a user request to download a data object from the P2P network;
identify a metadata object associated with the requested data object, wherein the metadata object includes at least a checksum of the data object;
obtain a metadata object associated with the requested data object;
extract from the metadata object the checksum of the data object;
determine if the extracted checksum is associated with a malicious data object by comparing the checksum associated with the requested data object with a plurality of checksums of malicious data objects stored in the local malware database;
deny user request to download the data object from the P2P network if it is determined that the checksum is associated with a malicious data object and further notify other peer nodes in the P2P network that the data object is malicious to prevent distribution of the malicious data object through the P2P network; or
grant user request to download the data object from the P2P network if it is determined that the checksum is not associated with a malicious data object;
download pieces of the requested data object from a plurality of peer nodes;
analyze each downloaded piece of the data object for presence of malware;
when malware is detected in a piece of the data object, terminate the download of remaining pieces of the data object; and
when all of the piece of the data object are downloaded, verify authenticity of the downloaded data object by computing checksum of the downloaded data object and comparing the computed checksum with the extracted checksum, wherein
if the computed checksum and the extracted checksum are identical, determining the downloaded data object is authentic, and
if the computed checksum and extracted checksum are not identical, repeating the step of downloading the pieces of the requested data object from the plurality of peer nodes and analyzing each piece for the presence of malware.

6. The system of claim 5, wherein the processor being further configured to:
determine if the downloaded and authenticated data object is malicious by performing antivirus analysis of the data object.

7. The system of claim 6, wherein the processor being further configured to:
update local malware database with a copy of the checksum of the requested data object if it is determined that the requested data object is malicious.

8. The system of claim 7, wherein the processor being further configured to:
determine if a remote malware database, which is accessible to the plurality of peer nodes, contains a copy of the checksum of the malicious data object; and
update the remote malware database with a copy of the of the checksum if it is determined that the remote malware database does not contain said checksum.

9. A computer program product embedded in a non-transitory computer-readable storage medium, the computer-readable storage medium comprises computer-executable instructions for malware detection in a peer-to-peer (P2P) network, the medium comprises instructions for:
receiving by a peer node a user request to download a data object from the P2P network;
identifying a metadata object associated with the requested data object, wherein the metadata object includes at least a checksum of the data object;
obtaining the identified metadata object associated with the requested data object;
extracting from the metadata object the checksum of the data object;
determining if the extracted checksum is associated with a malicious data object by comparing the checksum associated with the requested data object with a plurality of checksums associated with known malicious data objects stored in a local malware database;
denying user request to download the data object from the P2P network if it is determined that the checksum is associated with a malicious data object and further notifying other peer nodes in the P2P network that the data object is malicious to prevent distribution of the malicious data object through the P2P network; or
granting user request to download the data object from the P2P network if it is determined that the checksum is not associated with a malicious data object;
downloading pieces of the requested data object from a plurality of peer nodes;
analyzing each downloaded piece of the data object for presence of malware;
when malware is detected in a piece of the data object, terminating downloading of remaining pieces of the data object; and
when all of the piece of the data object are downloaded, verifying authenticity of the downloaded data object by computing checksum of the downloaded data object and comparing the computed checksum with the extracted checksum, wherein
if the computed checksum and the extracted checksum are identical, determining the downloaded data object is authentic, and
if the computed checksum and extracted checksum are not identical, repeating the step of downloading the pieces of the requested data object from the plurality of peer nodes and analyzing each piece for the presence of malware.

10. The computer program product of claim 9 further comprises instructions for:
determining by the peer node if the downloaded and authenticated data object is malicious by performing antivirus analysis of the data object.

11. The computer program product of claim 10 further comprises instructions for:
updating local malware database with a copy of the checksum of the requested data object if it is determined that the requested data object is malicious.

12. The computer program product of claim 11 further comprises instructions for:
determining if a remote malware database, which is accessible to the plurality of peer nodes, contains a copy of the checksum of the malicious data object; and
updating the remote malware database with a copy of the of the checksum if it is determined that the remote malware database does not contain said checksum.

\* \* \* \* \*